March 8, 1938. O. WITTEL 2,110,493

CLUTCH SUPPORT IN MOTION PICTURE APPARATUS

Filed Dec. 15, 1936

Otto Wittel
INVENTOR.

BY Newton M. Perrins
George A. Gillette, Jr.
ATTORNEYS

Patented Mar. 8, 1938

2,110,493

UNITED STATES PATENT OFFICE 2,110,493

CLUTCH SUPPORT IN MOTION PICTURE APPARATUS

Otto Wittel, Rochester, N. Y., assignor to Eastman Kodak Company, Rochester, N. Y., a corporation of New Jersey Application December 15, 1936, Serial No. 115,968

5 Claims. (Cl. 192—67)

The present invention is a continuation-in-part of U. S. application, Serial No. 76,174, filed April 24, 1936 and relates to the mounting for a driving clutch member of a motion picture apparatus of the magazine type.

Since the positioning or locating arrangement for film magazines including a driven clutch member may vary, it is quite essential that the driving clutch member have some flexibility both to permit depression of said clutch member until both clutch members fit into proper engagement or to permit rotation of the clutch members around non-coaxial axes.

The primary object of the present invention is the provision of a mounting for the driving clutch member of a motion picture apparatus, which driving clutch member permits depression in the event of non-engagement with its complementary clutch member and/or a swivel movement to facilitate such engagement and permit a driving connection even though the individual clutch members are rotating about non-coaxial axes.

To these and other ends, the invention consists of certain parts and combinations of parts, all of which will be hereinafter described, the novel features being pointed out in the appended claims.

Reference is hereby made to the accompanying drawing wherein like reference characters designate similar elements and wherein.

Figure 1:
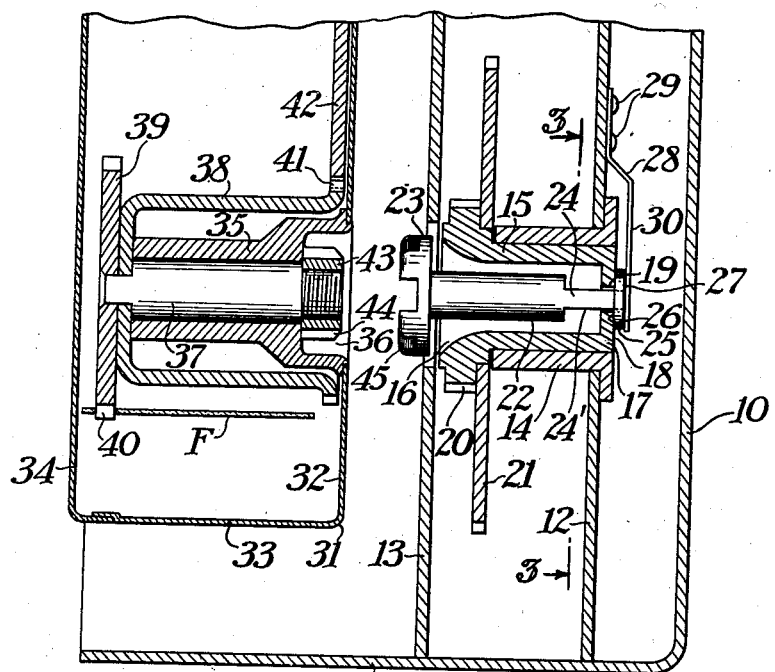
Fig. 1 is a transverse cross section to an enlarged scale through the driving and driven clutch members, respectively, in the motion picture apparatus and in the film magazine.

By way of example only the invention is disclosed as applied to a motion picture camera of the magazine type. Such camera includes a casing 10 with an edge wall 11. A mechanism plate 12 is longitudinally mounted within the casing 10, while a cover plate 13 encloses the camera mechanism within casing 10 and forms one side of a magazine chamber for a film magazine.

According to the invention the driving clutch member is resiliently urged into the magazine chamber and is mounted for a swivel-like movement as will now be described. A hollow supporting bushing 14 is fastened to mechanism plate 12. A cap member 15 is journaled in supporting bushing 14, is provided internally with a flared recess 16 and has an end wall 17. Said end wall 17 has a flat end surface 18 and is provided with an opening 19. The opening 19 has at least one flat side for a purpose to be later described. Cap member 15 carries a ring of teeth 20 and a pinion gear 21 for engagement with other gears in the camera, not shown.

A stem member 22 has a driving clutch member 23 attached to one end thereof, includes near the other end a restricted portion 24 having a flat 24', and includes at the other end a retaining portion 25 which has parallel flat surfaces, an inner flat surface 26 facing the flat end surface 18 of cap member 15 and an outer flat surface 27.

A resilient means is mounted within the apparatus to bear upon one end of the stem member 22 and may specifically comprise a spring member 28 fastened to mechanism plate 12 by rivets 29 and having a flat portion 30 which is parallel to the outer flat surface 27 of retaining portion 25.

The stem member 22 fits loosely within the flared recess 16 of cap member 15 and the restricted portion 24 fits loosely into the opening 19 in the end of cap member 15 so that said stem member 22 may swivel within the hollow cap member 15. However, the flat 24' on restricted portion 24 co-operates with the flat side of opening 19 so that the stem member 22 will rotate with the cap member 15 after engagement of these surfaces. Furthermore, the spring member 28 accomplishes two functions. First, said spring member 28 bears on the retaining portion 25 to move the stem member 22 and the driving clutch member 23 toward the magazine chamber. At the same time the flat portion 30 of spring 28 bears upon the outer flat surface 27 of retaining portion 25 and the inner flat surface 26 of said retaining portion 25 is pressed against the flat end surface 18 of cap member 15 so that the stem member 22 tends to be centered within the flared recess 16 of said cap member 15.

The film magazine for insertion into the magazine chamber may be of standard design in which the driven clutch member of the magazine is recessed within a lateral depression of the magazine casing so that several magazines may be conveniently stacked, one on top of the other. Such a film magazine may comprise a casing 31 having a side wall 32, an edge wall 33 and a cover 34. A bushing 35 is attached to side wall 32 and is provided at one end with a lateral depression 36. A shaft 37 is journaled in bushing 35 and is connected at one end to a cap 38 and sprocket disc 39. The sprocket disc 39 has a plurality of teeth 40 for engaging the usual perforations in a film strip F. The cap 38 has a toothed skirt 41 for engaging with a pinion gear 42 within the magazine casing 31. A driven clutch member 43 is threaded onto the other end of shaft 37 and is provided with a plurality of teeth 44. The driving clutch member 23 is also provided with teeth 45 which are adapted to inter-engage with the teeth 44 on the driven clutch member 43.

Upon relative axial movement of the magazine and camera toward each other, the teeth 45 on clutch member 23 will interengage with the teeth 44 on driven clutch member 43 to form a driving connection. In the event that the teeth 45 abut against the end of driven clutch member 43, the spring member 28 permits depression or retraction of the driving clutch member 23 and stem member 22 until such time as the teeth 44 and 45 become properly inter-engaged which interengagement is accompanied or occasioned by movement of the driving clutch member 23 toward the clutch member 43 under the influence of spring 28.

In the event that the clutch members 23 and 43 are not in perfect axial alignment, the loose connection between stem member 22 and cap member 15 and between the restricted portion 24 and the opening 19 in cap member 15 will permit clutch member 23 and stem member 22 to swing in the direction necessary for inter-engagement of the clutch members. Upon withdrawal of a non-aligning clutch member 43, the flat portion of spring member 28 will press against the outer flat surface 27 of retaining portion 25 and in turn will cause the inner flat surface 26 to be flattened against the flat end surface 18 of end wall 17 on cap member 15 so that the stem member 22 and clutch member 23 will be righted or centered within the flared recess 16 within cap member 15.

Figure 2:
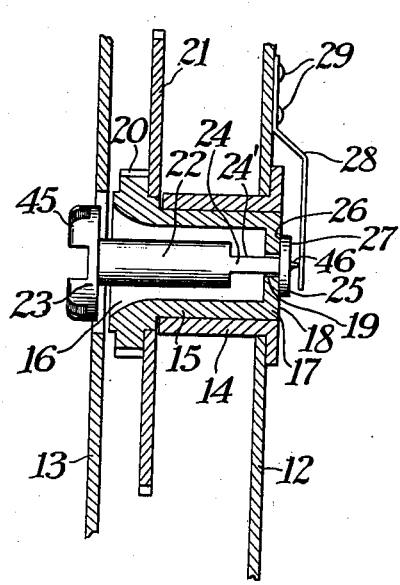
Fig. 2 is a similar transverse cross section through the driving clutch member which is provided with a modified form of bearing surface for the resilient means or spring member.
Figure 3:
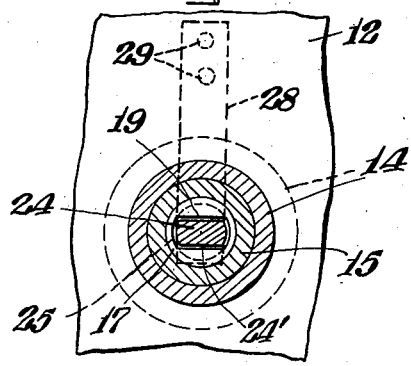
Fig. 3 is a fragmentary cross-section taken on the line 3—3 of Fig. 1.

Since the axial resilient pressure of the spring member 28 and the tendency of the inner flat surface 26 of retaining portion 25 to flatten against the flat end surface 18 of end wall 17 is sufficient to center stem member 22 within cap member 15 and since it may be desirable to reduce the frictional engagement between spring member 28 and retaining portion 25, the modification illustrated in Fig. 2 becomes advantageous. According to said modification a pointed projection 46 extends beyond the outer flat surface 27 of retaining portion 25 and spring member 28 bears upon said pointed projection 46. It is obvious that the performance of the clutch mounting according to the invention is not affected by this modification, whereas the frictional resistance of the clutch mounting may be somewhat reduced.

Since many other modifications of the present invention are possible, the present disclosure is to be construed in an illustrative sense and limited only in scope by the following claims.

Having now particularly described my invention what I desire to secure by Letters Patent of the United States and what I claim is:

1. In a device of the character described, the combination with a journal, and a hollow cap member rotatably mounted in said journal, having at one end an end wall which is provided with an opening having a flat side, of a stem member extending through said cap member and having a restricted portion fitting loosely into the opening in said cap member, said restricted portion having a flat engaged by the flat side of said opening, a clutch member on one end of said stem member, and a resilient means bearing upon the other end of said stem member.

2. In a device of the character described, the combination with a journal, and a hollow cap member rotatably mounted in said journal, having at one end an end wall with a flat surface which is provided with an opening having a flat side, and being provided with a flared recess which diverges away from said end wall, of a stem member extending loosely through said cap member and having a restricted portion fitting loosely into the opening in said cap member, said restricted portion having a flat engaged by the flat side of said opening, a clutch member on one end of said stem member, and a resilient means bearing upon the other end of said stem member.

3. In a device of the character described, the combination with a journal, and a hollow cap member rotatably mounted in said journal having an end wall with a flat surface which is provided with an opening having a flat side, of a stem member extending through said cap member, having a restricted portion fitting loosely into said opening and having a retaining portion with a flat side facing the flat surface of the cap member, said restricted portion having a flat engaged by the flat side of said opening, a clutch member on one end of said stem member, and a resilient means bearing upon the other end of said stem member resiliently to press the flat side of said retaining portion against the surface on the cap member and tending to center said stem member within said cap member.

4. In a device of the character described, the combination with a journal, and a hollow cap member rotatably mounted in said journal and having an end wall with a flat surface which is provided with an opening having a flat side, of a stem member extending through said cap member, having a restricted portion fitting loosely into said opening and having a retaining portion with parallel flat sides, one of which faces the flat surface of the cap member, said restricted portion having a flat engaged by the flat side of said opening, a clutch member on one end of said stem member, and a flat spring member mounted in parallel relation to the flat sides on said stem member and bearing upon the outer flat side of said retaining portion resiliently to press the inner flat side thereof against the flat surface on said cap member.

5. In a device of the character described, the combination with a journal, and a hollow cap member rotatably mounted in said journal and provided at one end with an opening having a flat side, of a stem member extending through said cap member, having a restricted portion fitting loosely into the opening in said cap member and having a retaining portion with a pointed projection, said restricted portion having a flat engaged by the flat side of said opening, a clutch member on one end of said stem member, and a resilient means bearing upon the pointed projection at the other end of said stem member.

OTTO WITTEL.